(12) United States Patent
Kato et al.

(10) Patent No.: US 7,783,426 B2
(45) Date of Patent: Aug. 24, 2010

(54) DRIVING SUPPORT SYSTEM

(75) Inventors: Yoshiyuki Kato, Nagoya (JP);
Nobutaka Tauchi, Toyoake (JP)

(73) Assignee: DENSO CORPORATION, Kariya (JP)

( * ) Notice: Subject to any disclaimer, the term of this patent is extended or adjusted under 35 U.S.C. 154(b) by 1097 days.

(21) Appl. No.: 11/400,358

(22) Filed: Apr. 10, 2006

(65) Prior Publication Data

US 2006/0235615 A1    Oct. 19, 2006

(30) Foreign Application Priority Data

Apr. 15, 2005 (JP) ............................. 2005-118716
Feb. 13, 2006 (JP) ............................. 2006-035567

(51) Int. Cl.
*G06F 17/10* (2006.01)

(52) U.S. Cl. ............................. 701/300; 701/1; 701/23; 701/36; 701/48; 701/301; 180/167; 340/435; 340/436; 340/901; 340/903; 340/988; 702/182; 702/183; 702/188

(58) Field of Classification Search ................. 701/300, 701/301, 302, 23, 36
See application file for complete search history.

(56) References Cited

U.S. PATENT DOCUMENTS

| 5,774,069 | A | * | 6/1998 | Tanaka et al. ................ 340/903 |
| 5,865,265 | A | | 2/1999 | Matsumoto |
| 5,906,645 | A | * | 5/1999 | Kagawa et al. ................. 701/23 |
| 5,983,161 | A | * | 11/1999 | Lemelson et al. ............. 701/301 |
| 6,064,941 | A | * | 5/2000 | Nimura et al. ................ 701/210 |
| 6,161,071 | A | * | 12/2000 | Shuman et al. ................. 701/48 |
| 6,363,325 | B1 | * | 3/2002 | Bates et al. .................. 701/301 |
| 6,621,176 | B1 | * | 9/2003 | Nagasaka et al. ............. 307/9.1 |
| 6,714,894 | B1 | * | 3/2004 | Tobey et al. ................. 702/188 |
| 7,006,917 | B2 | * | 2/2006 | Hijikata ....................... 701/301 |
| 7,136,755 | B2 | * | 11/2006 | Yamamura ................... 701/301 |
| 7,395,138 | B2 | * | 7/2008 | Kondoh et al. .................. 701/1 |
| 7,499,775 | B2 | * | 3/2009 | Filippov et al. ................ 701/23 |
| 7,499,776 | B2 | * | 3/2009 | Allard et al. ................... 701/23 |
| 2002/0022927 | A1 | * | 2/2002 | Lemelson et al. ........... 701/301 |
| 2003/0065432 | A1 | * | 4/2003 | Shuman et al. ................ 701/48 |
| 2003/0236602 | A1 | * | 12/2003 | Kuge et al. .................... 701/36 |
| 2004/0080405 | A1 | * | 4/2004 | Hijikata ....................... 340/435 |

(Continued)

FOREIGN PATENT DOCUMENTS

JP    A-2000-311298    11/2000

(Continued)

*Primary Examiner*—Khoi Tran
*Assistant Examiner*—Jonathan Sample
(74) *Attorney, Agent, or Firm*—Posz Law Group, PLC

(57) ABSTRACT

A driving support system for a vehicle being adaptable to both of a manual driving of which driving operation is under control of a driver and an automated driving of which automated driving operation is under one of a partial control and a full control of automation, the driving support system includes a detection function for detecting a surrounding condition of the vehicle and a traveling condition of the vehicle and an information provision function for providing driving support information based on the surrounding condition of the vehicle and the traveling condition of the vehicle detected by the detection means. The driving support information is provided by the information provision function when the conditions of the vehicle meet a predetermined criterion for information provision, and the information provision function uses different predetermined criterion for information provision in the manual driving and in the automated driving respectively.

20 Claims, 4 Drawing Sheets

U.S. PATENT DOCUMENTS

| | | |
|---|---|---|
| 2004/0249550 A1* | 12/2004 | Yamamura ................... 701/96 |
| 2005/0033517 A1* | 2/2005 | Kondoh et al. .............. 701/301 |
| 2005/0090984 A1* | 4/2005 | Kobayashi et al. .......... 701/301 |
| 2005/0131588 A1* | 6/2005 | Kuge et al. .................... 701/1 |
| 2005/0131589 A1* | 6/2005 | Yamamura et al. ............. 701/1 |
| 2005/0209769 A1* | 9/2005 | Yamashita et al. .......... 701/117 |
| 2005/0278093 A1* | 12/2005 | Kameyama .................. 701/36 |
| 2006/0235615 A1* | 10/2006 | Kato et al. .................. 701/300 |

FOREIGN PATENT DOCUMENTS

JP      A-2001-23094      1/2001

* cited by examiner

DRIVING SUPPORT SYSTEM

CROSS REFERENCE TO RELATED APPLICATION

This application is based on and claims the benefit of priority of Japanese Patent Application No. 2005-118716 filed on Apr. 15, 2005, and Japanese Patent Application No. 2006-35567 filed on Feb. 13, 2006, the disclosure of which is incorporated herein by reference.

FIELD OF THE INVENTION

The present invention generally relates to a driving support system.

BACKGROUND OF THE INVENTION

Conventionally, a driving support system is used to support a driver in a subject vehicle by providing information on, for example, surrounding traffic or the like while the subject vehicle is traveling. The information on the surrounding traffic is provided for the driver of the subject vehicle in a timely manner, and that allows the driver to suitably operate an acceleration pedal, a brake pedal or the like based on, for example, recognition of closeness to other vehicles. Further, the driving support system disclosed in U.S. Pat. No. 5,865,265 and Japanese Patent Application JP-A-2000-311298 provides the information for the driver in a variable manner in terms of information provision timing, basically according to a condition of surrounding traffic. The information provision timing may also be varied according preference of the driver. In this manner, the driver utilizes the provided information for improvement of safety and appropriateness of driving.

In recent years, driving operations of the vehicle are partially automated by combining sensing devices with the driving mechanism. For example, a radar for watching/scanning a front space of the vehicle combined with acceleration mechanism for controlling vehicle speed is getting widely used as a radar cruise system or an adaptive cruise control system. Further, a parking assist system for automatically controlling a steering wheel as well as vehicle speed to suitably maneuver the vehicle into a target parking lot is now commercially available.

Even in an occasion of using those automation technologies, provision of information on the surrounding traffic for the driver is beneficial from various viewpoints. That is, the vehicle may be involved in a hazardous/dangerous situation for various reasons even when the vehicle is automatically controlled. (In this application, a full-automated driving and a partially-automated driving are both designated as an automated driving.)

However, the provision of the information should appropriately be controlled according to the degree of automation of the driving. In other words, an appropriate manner of information provision should be differently arranged for a fully-automated driving, a partially-automated driving and a manual driving in terms of suitability for supporting the driving operation in each of the driving modes of the vehicle.

SUMMARY OF THE INVENTION

In view of the above-described and other problems, the present invention provides a driving support system that delivers driving support information for suitably assisting driving condition of a vehicle having both of a manual driving function and an automated driving function.

The driving support system of the present invention includes a detection function for detecting a surrounding condition of the vehicle and a traveling condition of the vehicle, and an information provision function for providing driving support information based on the surrounding condition of the vehicle and the traveling condition of the vehicle detected by the detection function. The driving support information is provided by the information provision function when the surrounding condition of the vehicle and the traveling condition of the vehicle meet a predetermined criterion for information provision, and the information provision function uses respectively different predetermined criteria in the manual driving and in the automated driving.

In this case, the driving support system provides the driving support information for, for example, a certain driving condition (e.g., manual driving) based on a surrounding condition of the vehicle, and the same driving support information may not be provided for another driving condition (e.g., automated driving). Therefore, the driving support information can be provided for suitably supporting both driving conditions by defining respectively different criterion for each of the conditions.

In another aspect of the present invention, the driving support system provides driving support information based on respectively different criterion for each of a partially-automated driving and a fully-automated driving when the vehicle is equipped with both types of automated driving modes. For example, the driving condition of the vehicle that is under control of automatic acceleration with a manual steering operation (partially-automated driving) is different from the driving condition of the vehicle that is under control of fully-automated operation in terms of operation load to a driver of the vehicle and required degree of attentiveness. Therefore, the driving support information required for each of the driving modes (driving conditions in either of the partially- or fully-automated driving) is different. In view of the above-described situation, the driving support system provides respectively different driving support information for different types of the automated driving mode in order to suitably support the driving.

In yet another aspect of the present invention, the information provision function categorizes vehicle condition into a plurality of risk levels by using the predetermined criteria based on the surrounding condition of the vehicle and the traveling condition of the vehicle detected by the detection function. The information provision function defines different predetermined criteria for providing the driving support information in the manual driving and the automated driving by assigning different risk levels to different predetermined criteria. In this manner, the driving support information provided by the driving support system can be utilized by the driver more suitably in terms of supporting the driving condition of the vehicle. In other words, the driving support information is tailored for the manual driving or for the automated driving based on the different predetermined criteria.

In still yet another aspect of the present invention, the driving support information provided in the partially-automated driving includes the information in a lower risk levels compared to the driving support information provided in the manual driving. In this manner, the attentiveness of the driver in the partially-automated driving mode can suitably be supported by more frequent provision of the driving support information.

In still yet another aspect of the present invention, the driving support information in the fully-automated driving is less frequently provided than other driving modes for more suitably supporting the fully automated driving by providing the information in higher risk levels. In this manner, the driving support information can support the driver of the vehicle in an appropriate manner in terms of allowing the driver to be less nervous about the driving condition of the vehicle.

In still yet another aspect of the present invention, the predetermined criteria is used to categorize the three types of driving modes into at least two groups. That is, the manual driving, the partially-automated driving and the fully-automated driving uses at least two different predetermined criteria. For example, the manual driving uses a first predetermined criterion, and the partially/fully-automated driving use a second predetermined criterion in terms of risk level categorization. In this manner, the driving support information serves each of the driving modes more suitably in terms of the risk levels assigned to the driving modes.

In still yet another aspect of the present invention, the driving support information is provided in a variable manner according to at least one of vehicle speed and the condition of traveling road. For example, the attentiveness of the driver required in each of the driving modes varies when the vehicle speed increases/decreases in a high speed traveling in an expressway or in a low speed traveling in traffic congestion. Therefore, the driving support information provided by the driving support system is tailored to appropriately support variety of the traveling conditions and surrounding conditions.

In still yet another aspect of the present invention, the driving support system determines a recommended condition of driving for the driver by using a determination function, and provides information on discrepancy between the recommended condition and an actual/current condition when the actual/current condition is different from the recommended condition. In this manner, the driving support system facilitates use of the partially/fully-automated driving mode when the vehicle has one of those driving modes.

In still yet another aspect of the present invention, the driving support system determines a current position of the vehicle by using a position detection function in the determination function, and determines the recommended condition of driving based on the detected current position. In this manner, the driving support system suitably supports the driving of the vehicle in terms of determination of the recommended condition of driving. That is, for example, an adaptive cruise control driving is recommended for the vehicle traveling in the expressway, and an adaptive gearshift control driving is recommended for the vehicle traveling on a steep/curvy road in a mountain.

In still yet another aspect of the present invention, the driving support system stores the driving condition of the vehicle in correlation with the environment of the vehicle, and the stored information is utilized for determining the recommended driving condition that suits driver's preference. In this manner, the driving support system can assume the driver's preference based on the detected environment for determining the recommended driving condition.

In still yet another aspect of the present invention, the driving support system adjustably alters the driving condition of the vehicle to the recommended driving condition determined by the determination function. In this manner, the automated driving mode is more effectively utilized. In this case, the alteration of the driving condition may be confirmed by the driver before alteration.

In still yet another aspect of the present invention, the driving support system includes a criteria setting function for setting the predetermined criterion. In this manner, the predetermined criterion can be tailored to reflect the driver's preference, and the driving support information can suitably provided for the driver.

In still yet another aspect of the present invention, the driving support system includes a current position detection function for detecting a current position of the vehicle, a driving condition alteration function for altering a type of driving of the vehicle according to the current position of the vehicle, a detection function for detecting a surrounding condition of the vehicle and the traveling condition of the vehicle and an information provision function for providing driving support information based on the surrounding condition of the vehicle and the traveling condition of the vehicle detected by the detection function. The driving support information is provided by the information provision function when the surrounding condition of the vehicle and the traveling condition of the vehicle meet the predetermined criterion for information provision, and the information provision function uses different predetermined criterion in the manual driving and the automated driving respectively. In this manner, the driving support system facilitates use of the automated driving mode that is adjustably tailored for the preference of the driver, and the driving support information is suitably provided for each of the driving mode.

In still yet another aspect of the present invention, the driving support system compares a preferred vehicle device setting in the type of driving altered by the driving condition alteration function with a current vehicle device setting, and the information provision function provides discrepancy information when the preferred vehicle device setting and the current vehicle device setting are different. In this manner, the driving support system distinguishes difference between the actual vehicle device setting and an expected device setting determined by the driving condition alteration function. That is, the driver of the vehicle is warned when the setting of the vehicle device is changed from an initial condition, because the change of the setting may affect provision of the driving support information required for supporting a specific driving condition.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Preferred embodiments of the present invention are described with reference to the drawings. A driving support system of the present invention is intended for use in a subject vehicle such as an automobile or the like.

First Embodiment

Figure 1:
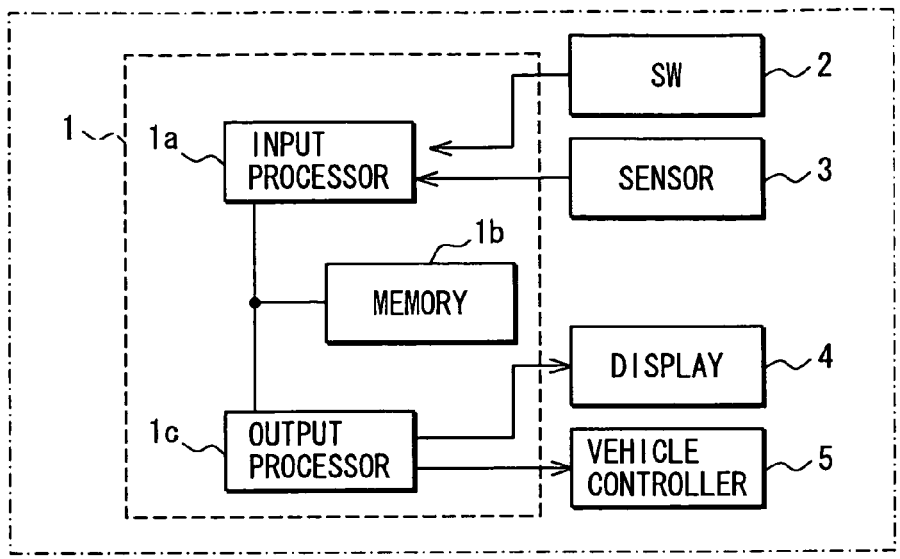
FIG. 1 shows a block diagram of a driving support system in a first embodiment of the present invention.

FIG. 1 shows a block diagram of a driving support system 100 in a first embodiment of the present invention. The driving support system 100 includes a switch unit 2, a sensor unit 3, a display unit 4, a vehicle control unit 5 and a controller 1 for controlling those units.

The switch unit 2 is a switch for turning on/off automated driving of the subject vehicle. The driver uses the switch unit 2 to send instruction signal to an input processor 1a in the controller 1.

The sensor unit 3 includes sensors for detecting various conditions around the subject vehicle. The detected conditions are utilized to provide driving support information to a driver of the subject vehicle while the subject vehicle is traveling. The sensor unit 3 also includes sensors for detecting obstacles around the vehicle, for detecting road condition and for detecting vehicle condition. The obstacle/road condition is also detected by using a GPS receiver, an image sensor (camera), an ultrasonic sensor and the like. The sensor unit 3 may also receive information on the road condition from external sources such as Internet, a traffic information system or the like through communication device. The vehicle condition is detected by using a speed sensor, an acceleration sensor, a compass, a steering sensor, a fuel injection sensor, an airflow sensor and the like.

The display unit 4 displays the driving support information such as existence of an obstacle around the subject vehicle on a screen that is made with a liquid crystal panel, an LED panel or the like. The display unit 4 may be accompanied by a speaker or the like.

The vehicle control unit 5 includes vehicle controlling devices such as a steering control device, a brake control device, a throttle control device, a fuel injection control device, a shift position control device and the like.

The controller 1 is a computer of well-known type, and includes a CPU, a ROM, a RAM, an I/O and a bus line for connecting those components included therein. The ROM stores a program that is executed in the controller 1, and the program controls various processes executed in the CPU. The controller 1 includes the input processor 1a, a memory unit 1b and an output processor 1c.

The input processor 1a receives a signal from the switch unit 2 or the sensor unit 3, and processes the received signal according to the type of the received signal. For example, the input processor 1a transfers an automated driving control signal inputted from the switch unit 2 to the output processor 1c. The input processor 1a determines surrounding condition of the subject vehicle and traveling condition based on a signal inputted from the sensor unit 3. The input processor 1a also transfers the determined condition of the subject vehicle to the output processor 1c when the vehicle is traveling in the automated driving mode, and controls the output processor 1c to regulate various parts of the subject vehicle in pursuit of suitable travel condition of the subject vehicle. Further, the input processor 1a determines whether provision of a warning is required, and provides instruction about a required type of warning for the output processor 1c when provision of the warning is required.

The memory unit 1b stores various kinds of information for, for example, displaying various types of warning messages on the display unit 4.

The output processor 1c executes various processes based on instruction transferred from the input processor 1a. For example, the output processor 1c controls the vehicle control unit 5 to operate in a predetermined manner when the automated driving control signal is transferred from the input processor 1a. In this case, the operation of the vehicle control unit 5 is determined by the information on the surrounding condition of the subject vehicle and the vehicle condition transferred from the input processor 1a together with the automated driving control signal. The output processor 1c controls the display unit 4 for displaying a warning message retrieved from the memory unit 1b when a warning provision instruction is transferred from the input processor 1a.

The condition of the subject vehicle is categorized into plural risk levels in the present embodiment. In the subject vehicle under control of the automated driving, the driving support information is provided for the driver only when the vehicle condition is equal to or above a certain risk level. In this manner, unnecessary anxiety of the driver in the vehicle under control of the automated driving due to provision of the driving support information for the vehicle condition in a lower risk level is prevented. On the other hand, the driving support information is provided for the driver in the subject vehicle that is under control of the manual driving when the vehicle condition is relatively low in terms of the risk level, because the driver who manually drives the subject vehicle has to be well-informed for preventing an accident.

Figure 4:
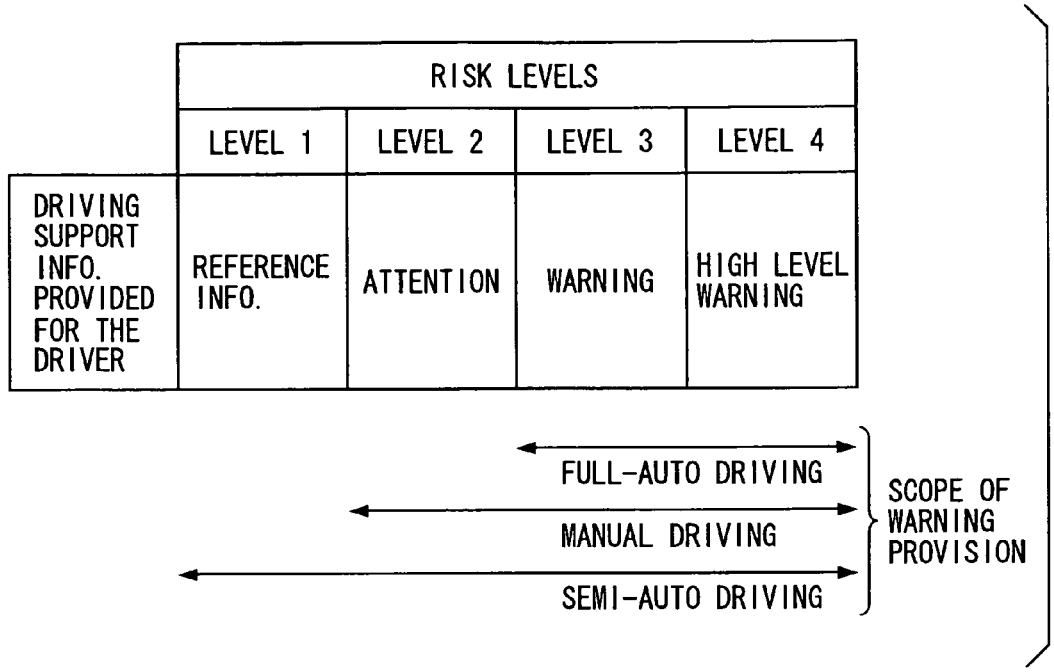
FIG. 4 shows a table of risk levels and information provision criteria for each of the driving modes.

An example of the risk levels is shown in FIG. 4. That is, in the risk level 1, reference information such as "High risk intersection approaching" is provided for the driver, and in the risk level 2, information calling for attention such as "Sharp turn approaching" is provided for the driver. Further, the risk level 3 is defined by a hazardous situation that leads to an accident or the like, and warning information such as "Obstacle approaching" is provided. In the risk level 4, life-threatening situation is warned by provision of high level warning such as "Collision course" or the like. The driving support information in the risk levels of 3 and 4 is provided only for the driver in the subject vehicle of the automated driving. The reference information or the attention calling information is not provided for the driver under control of the automated driving mode on an assumption that the vehicle under control of the automated driving mode handles low risk situation without support, thereby being not in great need of the information in those risk levels.

The risk levels used in the manual driving and the automated driving may be changed for categorizing a same situation into a different risk level. For example, a certain distance (e.g., 7 meters) to an obstacle may be categorized as the risk level 3 in the manual driving and as the risk level 4 in the automated driving by changing (i.e., decreasing) a threshold between the risk levels 3 and 4 in the two driving modes. That is, the threshold may be 10 meters in the manual driving mode for categorizing the distance (i.e., 7 meters) to the obstacle into the risk level 4, and the threshold may be 5 meters in the automated driving mode for categorizing the same distance to the obstacle into the risk level 3. In this manner, the threshold between two risk levels may be adjusted to suitably provide the driving support information at different timing in different driving modes. This kind of adjustment is based on an assumption that the driver in the manual driving mode requires greater distance to the obstacle in order to safely avoid collision with the obstacle compared to the driver in the automated driving mode.

The information provision process executed by the controller 1 is described with reference to a flowchart in FIG. 2. The subject vehicle is in either of the manual driving mode or the automated driving mode based on an input from the switch unit 2.

In step S10, the provision process receives information from the sensor unit 3, and determines surrounding condition of the vehicle as well as the traveling condition based on the received information. The determined condition is utilized for provision of the driving support information regarding an environment of the vehicle for the driver as required. The information from the sensor unit 3 is utilized for provision of instruction of a certain operation for the vehicle control unit 5.

In step S20, the process determines whether a warning is required based on the determination in step S10. In this case, the warning is provided when the current traveling condition is determined to be in a certain risk level. The process returns to step S10 when the warning is not required (NO in step S20), and the process proceeds to step S30 when the warning is required (YES in step S20). That is, the process is kept in a "Watch" state for determining the surrounding condition and the traveling condition in step S10 until the warning is determined to be required.

In step S30, the driving condition (i.e., the driving mode) currently controlling the subject vehicle is determined. That is, a type of the driving mode is determined to be either of the manual driving or the automated driving in this step.

In step S40, provision of the warning (provision of the support information) is determined based on assessment of the driving mode. For example, the information in all risk levels is provided for the driver as the warning when the subject vehicle is in the manual driving mode, and the information only in certain risk levels is provided for the driver as the warning when the subject vehicle is in the automated driving mode to maintain safety of the subject vehicle. In other words, the information in other risk levels is not provided for the driver in the automated driving mode because the information in lower risk levels is considered to have little effect on the subject vehicle in the automated driving mode.

In addition, determination criterion of the provision of the warning in step S20 is eased when the threshold between the risk levels 3 and 4 is respectively different for the manual driving mode and the automated driving mode. That is, the process always determines that the warning is required for the vehicle in step S20. As a result, the vehicle condition may not fall within any risk level in step S40 when the vehicle is in the automated driving mode, thereby allowing the process to determine that the warning is not required.

The process proceeds from step S40 to step S50 when the warning is necessary in step S40.

In step S50, the warning is provided in a suitable manner for the information available on the display unit 4. For example, the warning may be displayed as a message such as "Sharp curve ahead. Drive with caution." or "Another vehicle ahead. Slow down." or the like. The process returns to step S1 when the vehicle is in the automated driving mode or when the warning is not required. The process repeats steps S10 to S50.

In the present embodiment, the criteria for providing the warning is different for the automated driving mode and for the manual driving mode. That is, the warning is provided for different risk levels in the automated driving mode and the manual driving mode. In this manner, the driver in the manual driving mode receives the information of lower risk levels and the driver in the automated driving mode receives the information of only high risk levels. This scheme of warning provision allows the driving support system 100 to provide required warning at right timing in each of the driving modes without compromising safety of the vehicle. This scheme also allows the driving support system 100 to prevent unnecessary provision of the warning in the automated driving mode.

Description of the present embodiment is dedicated mainly to the fully-automated driving as thus far. That is, in the fully-automated driving mode, the information is provided only for conditions in high risk levels, because hazardous situations are automatically avoided in the fully-automated driving mode.

On the contrary, in the partially-automated driving mode, the information provision may preferably be performed even for the conditions in lower risk levels, because of the following reasons. That is, the driver in the partially-automated driving mode may unintentionally turn off the partially-automated driving mode because of the partial control afforded to the driver. In this case, the driver might continue to depend on the unintentionally turned-off partially-automated driving mode, only to be involved in a dangerous situation. In another case of the partially-automated driving mode, the driver might be overly dependent on the support of the partially-automated driving provided by the driving mode to have lowered level of attentiveness. In view of these problems, the driving support system 100 may be programmed to provide the information in the lower risk levels in the partially-automated driving mode compared to the other driving modes.

Examples of the fully-automated driving mode and the partially-automated driving mode are described in the following. That is, the fully-automated driving mode controls the vehicle speed as well as the steering wheel. The subject vehicle may be under control of the fully-automated driving mode in the expressway or the like, to adaptively follow a preceding vehicle or to travel at a predetermined speed on its own with an automated steering for keeping a lane on the road. When the subject vehicle is partially-automated, only controls over the vehicle speed or operation of the steering wheel is provided by the driving support system with other operation afforded to the driver.

Another distinction between the fully-automated driving mode and the partially-automated driving mode may be found in acceleration/deceleration operation by using an accelerator and/or a brake. For example, the subject vehicle in the adaptive cruise control in a low speed range may be brought to full stop in the fully-automated driving mode when the preceding vehicle stops, while the subject vehicle in the partially-automated driving mode may only be brought under a certain speed to let the driver handle the same situation. Further, the subject vehicle in the fully-automated driving mode may automatically accelerate when the preceding vehicle departs, while the subject vehicle in the partially-automated driving mode may be left un-accelerated until the driver puts the subject vehicle in an operation.

The driving support information provision process in multiple driving modes is described in the following with reference to a flowchart in FIG. 3. In this case, the driving modes may be switched among the fully-automated driving mode, the partially-automated driving mode and the manual driving mode.

Figure 2:
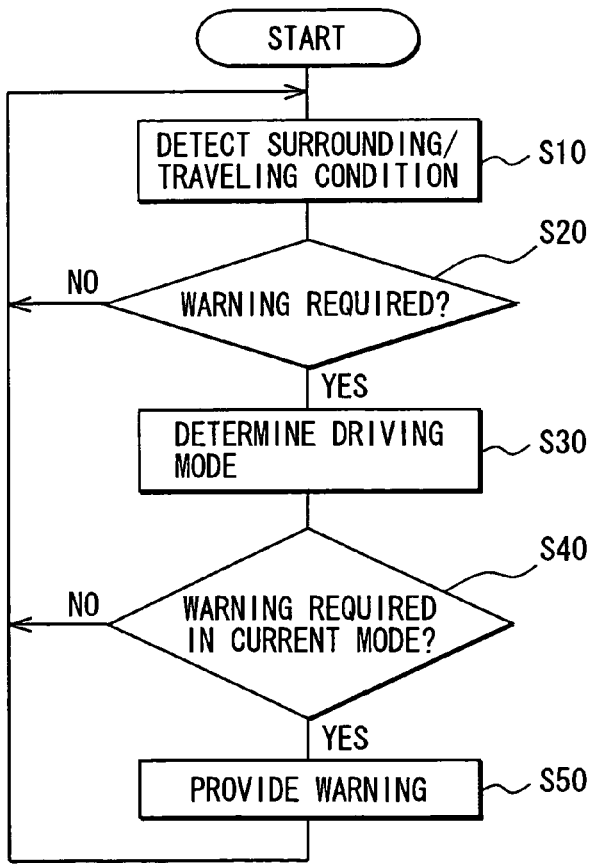
FIG. 2 shows a flowchart of an information provision process executed by a controller in the driving support system.

In steps S110 and S120, as already described as steps S10 and S20 in the flowchart in FIG. 2, the driving support information provision process determines the surrounding condition/traveling condition and whether the warning is required. The process proceeds to step S130 when the warning is determined to be required in step S120. The process returns to step S110 when the warning is not required.

In step S130, the driving mode currently controlling the subject vehicle is determined as in step S30. That is, a type of the driving mode is determined to be either of the manual driving mode, the partially-automated driving mode or the fully-automated driving mode in this step. The process proceeds to either of steps S150, S160, or S170 after distinction of driving condition in step S140. Step S150 performs the information provision process for the fully-automated driving mode, step S160 performs the same process for the partially-automated driving mode, and step S170 performs the same process for the manual driving mode.

The information provided in each of the driving modes is described according to the table of risk levels in FIG. 4. That is, the information in the risk level 3 or above is provided in the fully-automated driving mode, the information in the risk level 2 or above is provided in the manual driving mode, and the information in all risk levels is provided in the partially-automated driving mode, based on the assumption that the driver of the subject vehicle may preferably be fully informed in the partially-automated driving mode.

Therefore, in step S150, only high level risk information (level 3 or above) is provided for the driver in the fully-automated driving mode, and in step S160, middle level risk information (risk level 2 or above) is provided for the driver in the manual driving mode. In step S170, risk information in all levels is provided for the driver in the partially-automated driving mode.

In this case, the driving support system 100 may provide a warning for the driver in the manual driving mode that the subject vehicle is NOT under control of the partially-automated driving mode when the driver's behavior indicates that the driver is assuming the partially-automated type of control. For example, the distance from the preceding vehicle much smaller than the average distance in correlation with vehicle speed stored in the memory unit 1b may be regarded as an indication of unintentional manual driving mode (i.e., the partially-automated driving mode unintentionally turned off). The behavior of the subject vehicle departing from a currently traveling lane may trigger the same type of warning provided for the driver that the partially-automated driving mode is already turned off.

Further, the risk level of the information to be provided (criteria for information/warning provision) may be variably changed according to the condition of the road and/or the condition of the subject vehicle. For example, speed of the subject vehicle, the degree of traffic congestion, or scope of visibility on the road may be correlated with the information provision criteria. That is, increase in the vehicle speed, congestion degree, or visibility index may be inversely correlated with lower risk levels. Furthermore, decrease of the speed/degree/index may result in raised risk levels of information provision criteria because the subject vehicle may encounter less hazardous situation in a lower speed range or the like. Furthermore, the variable risk level for information provision may be different in each of the three driving modes, i.e., the fully-automated driving mode, the partially-automated driving mode and the manual driving mode.

Second Embodiment

A second embodiment of the present invention is described with reference to the drawings. In present embodiment, the driving support system is part of a vehicle navigation system 10. The vehicle navigation system 10 provides a navigation function, a communication function beside the driving support function.

Figure 5:
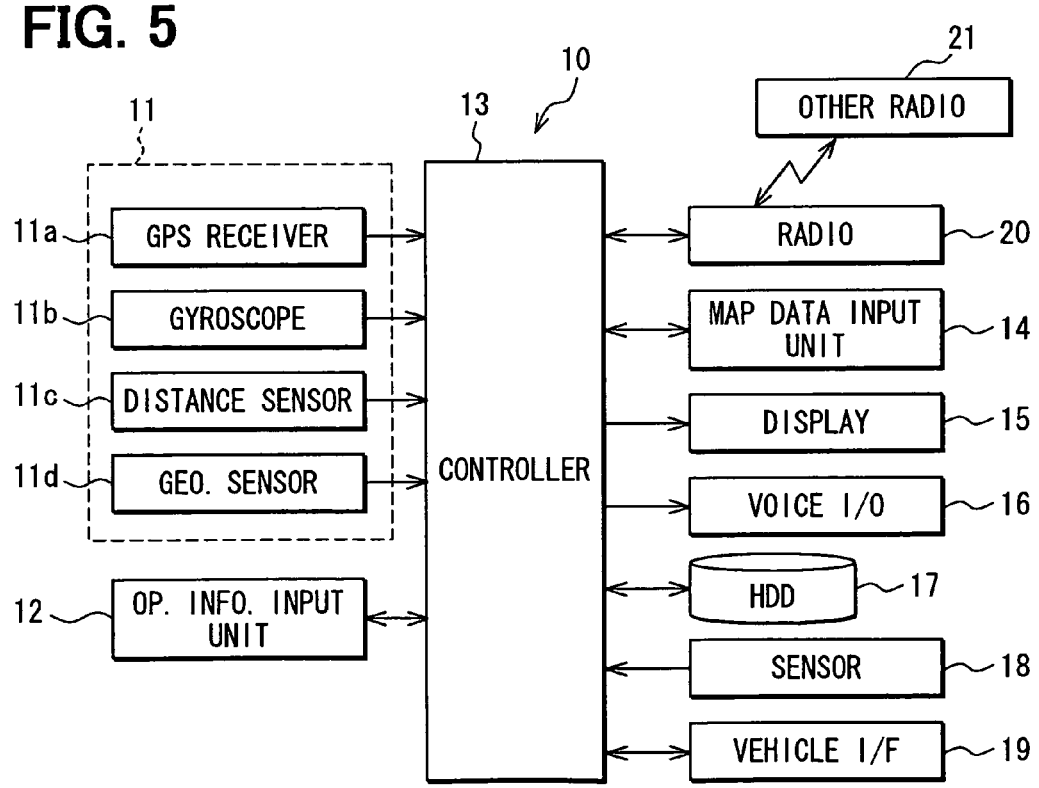
FIG. 5 shows a block diagram of a navigation system equipped with the driving support system in a second embodiment of the present invention.

The navigation system 10 includes a position detector 11, an operation information input unit 12, a map data input unit 14, a display unit 15, a voice input/output unit 16, a hard disk drive 17, a sensor unit 18, a vehicle interface (I/F) 19, a communication device 20 and a controller 13 as shown in FIG. 5.

The position detector 11 includes a plurality of sensors such as a Global Positioning System (GPS) receiver 11a, a gyro scope 11b, a distance sensor 11c, and a geomagnetism sensor 11d. The GPS receiver 11a detects position, orientation, speed of the vehicle, and the gyro sensor 11b detects application of rotational movement on the vehicle. The distance sensor 11c detects traveled distance based on an acceleration in a traveling direction and the like, and the geomagnetism sensor 11d detects the traveling direction based on a geomagnetism. These sensors compensates each other because of the respectively different nature of errors calculated therein when they are used to detect a current vehicle position. The position may be detected by only using some of the above sensors based on the accuracy or may be detected by using other sensors such as a steering sensor, a wheel sensor on each wheel in the vehicle, or the like.

The operation information input unit 12 is, for example, used for receiving inputs from the driver or the like, and the inputs are sent to the controller 13 as operation signals for setting destination of a travel or for setting a driving mode such as the manual driving mode, the partially-automated driving mode, the fully-automated driving mode or the like.

The map data input unit 14 is used to input road data of road network configuration, map data for map matching (for improvement of positional accuracy of the map), mark data for representing facilities on the map, and other types of data such as guidance image and recorded voice to the controller 13. The data to be inputted to the controller 13 is provided in memory medium such as a CD-ROM, a DVD-ROM, a hard disk drive, a memory unit, a memory card or the like.

The display unit 15 is a color type display unit, and the display unit 15 is made with a liquid crystal display panel, a plasma display panel, a CRT or the like. The display unit 15 is used to display a current position of the vehicle detected by the position detector 11 together with the road map around the current position having a guidance route to the destination, place names, facility names, and facility icons and the like based on the data inputted by the input unit 14. The display unit 15 is also capable of displaying facility guide or the like. The voice input/output unit 16 is used to provide guidance voice for a facility or the like inputted by the input unit 14 and/or the vehicle I/F 19.

The hard disk drive (HDD) 17 stores recommendation on driving modes or the like in correlation with the traveling position of the vehicle. For example, the vehicle traveling on an expressway is correlated with a driving condition under control of an adaptive cruise control with a preceding vehicle following function, and the vehicle traveling on a mountain road is correlated with a driving condition under control of an adaptive shift program for managing steep slopes and curves, based on a detected position of the vehicle. The vehicle in a parking may be correlated with a driving condition that utilizes an automated parking assist function for automatically maneuver the vehicle into one of parking lots. These driving conditions stored in the HDD 17 is utilized in the automated driving as templates of recommended driving modes.

The driving modes regarding the recommendation may be predetermined and stored in the driving support system, or may be inputted by using the input unit 12 to suitably support the driver's preference.

The vehicle I/F 19 is used to input external information of various types such as FM broadcasting signal, traffic information broadcast signal, radio beacon signal, optical beacon signal or the like through an antenna (not shown in the figure).

The communication device 20 is used to perform a short range communication such as a DSRC (Dedicated Short Range Communication), a Bluetooth (registered trademark), a wireless LAN, a UWB (Ultra Wide Band) communication.

The control circuit 13 includes a computer having a CPU, a ROM, a RAM, an I/O and a bus line for connecting these components. The control circuit 13 controls various processes including, for example, map display process for displaying the road map on the display unit 15 based on information such as the current position of the vehicle, map data inputted by the input unit 14 and the area of the map specified by the driver by using the operation information input unit 12. Other process controlled by the controller 13 is a navigation route provision process for navigating the vehicle by providing an optimum navigation route from the current position to the destination based on, for example, an input of a destination facility and route calculation algorithm such as Dijkstra method or the like.

The controller 13 communicates with the communication unit 20 for exchanging information with another navigation system through a communication unit 21 installed therein on another vehicle.

Figure 6:
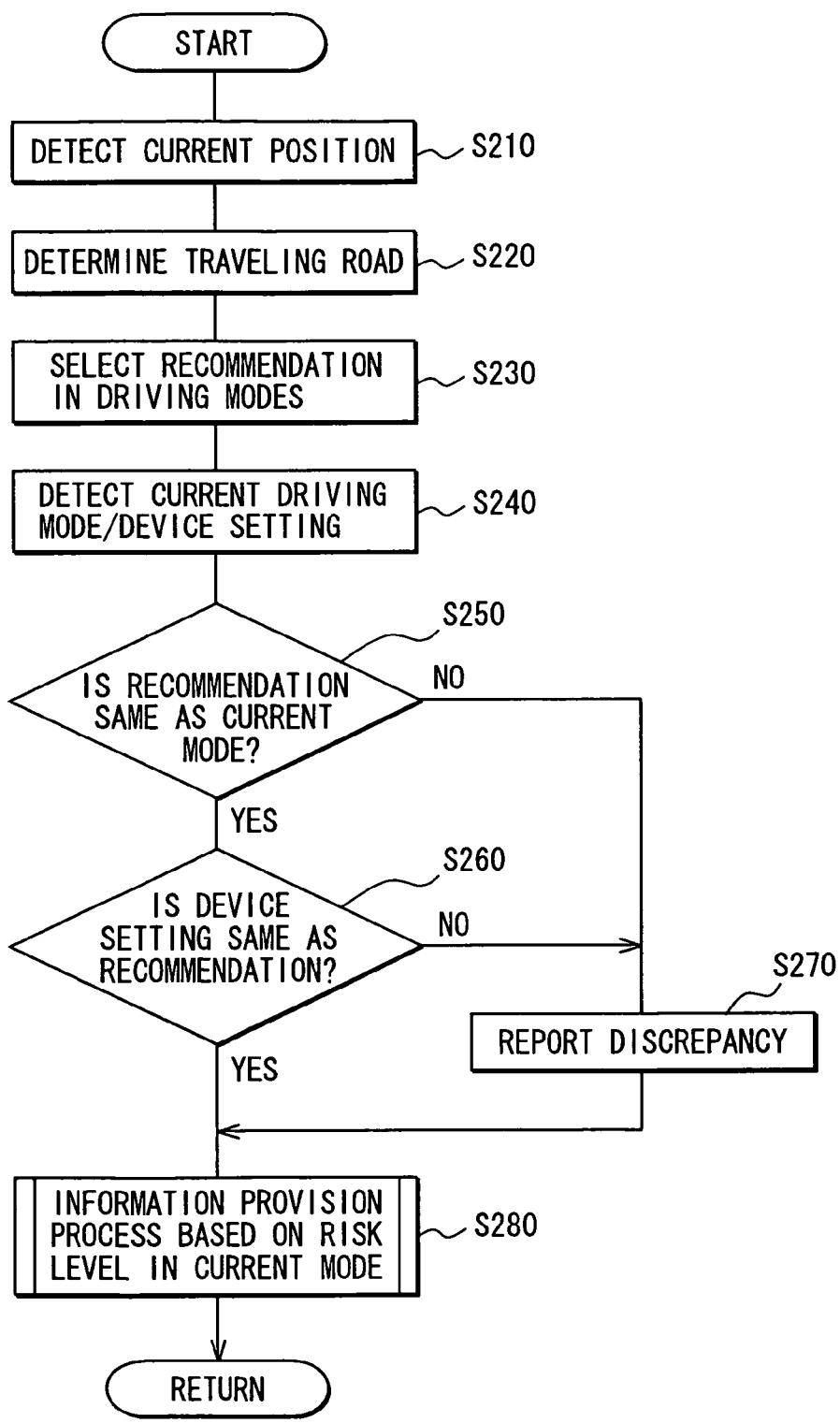
FIG. 6 shows a flowchart of an information provision process executed by the navigation system.

Provision process of the driving support information is now described with reference to a flowchart in FIG. 6.

In step S210, the process detect the current position, traveling direction and the like regarding the subject vehicle based on the signal from the position detector 11.

In step S220, the process determines traveling position (road) based on the current position, traveling direction, and the map data inputted by the map data input unit 14.

In step S230, the process selects recommendation of the driving mode based on the data stored in the HDD 17 when same condition in correlation with the current position is found in the stored data.

In step S240, the process detects the current driving mode as well as the vehicle device setting condition that affects the current driving mode. In this case, the vehicle device setting condition affecting the current driving mode is, for example, the device setting of the display unit 15, the voice I/O unit 16 or the like. The device such as the vehicle I/F unit 19, the communication unit 20 or the like may also be included in the affecting device.

In step S250, the process determines whether the recommendation is same as the current driving condition of the vehicle including the driving mode. The process proceeds to step S260 when the current driving condition including the type of the driving mode is determined to be the same as the recommendation. The process proceeds to step S270 when the current condition is not determined to be the same as the recommendation.

In step S270, the process provides discrepancy information that the recommendation is different from the current driving condition. In this manner, the process encourages the driver of the vehicle to use the partially/fully-automated driving mode when the vehicle is equipped with these driving modes.

In step S260, the process determines whether the vehicle device setting condition is kept in a recommended condition for use in the current driving mode. That is, for example, the process determines whether the setting of the display unit 15, the voice I/O unit 16 and the like is suitably controlled for the provision of the driving support information. Conditions of the vehicle I/F 19 and/or the communication unit 20 are also examined from a viewpoint that these units readily receive information for generating the driving support information. The process proceeds to step S270 when the vehicle device setting condition is different from the recommended condition.

Figure 3:
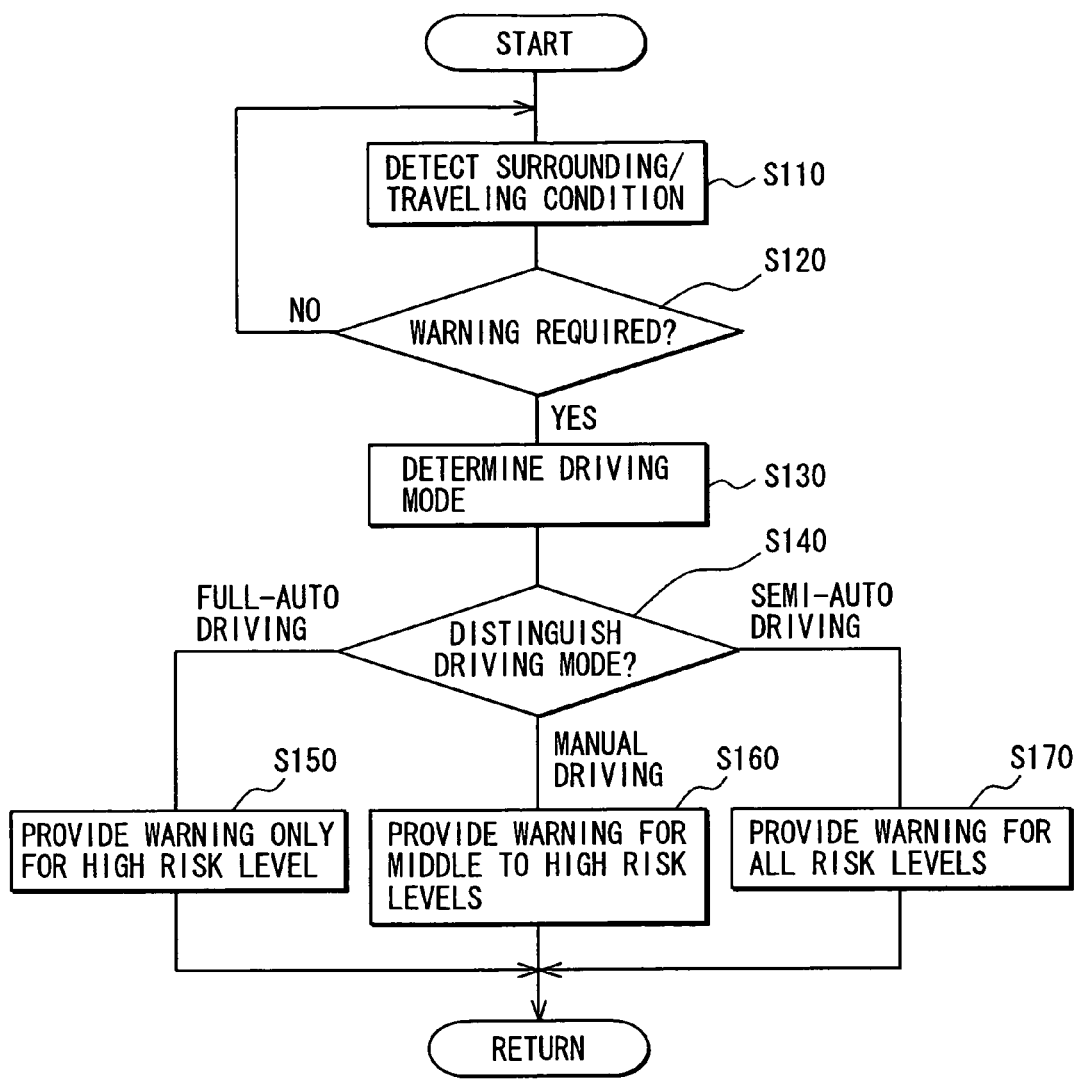
FIG. 3 shows a flowchart of the information provision process according to types of driving mode.

In step S280, the process executes the information provision process according to the detected risk level in the current driving mode that is described as the flowchart either in FIG. 2 or FIG. 3.

Although the present invention has been fully described in connection with the preferred embodiment thereof with reference to the accompanying drawings, it is to be noted that various changes and modifications will become apparent to those skilled in the art.

For example, information provision in each of the driving modes may be determined and specified by the driver. That is, risk levels regarding the information provision may be arbitrarily (i.e., respectively differently) correlated with each of the driving modes. In this manner, the information provision (provision of the warnings) may be suitably tailored according to the driver's preference in each of the driving modes. In other words, the information not required for the driver at a certain situation may be automatically filtered out from provision.

Further, the current driving mode of the vehicle in the second embodiment may be changed to the recommendation of the driving mode when the recommendation is selected in the stored data. In this manner, the automated driving is more effectively utilized. In this case, change of the driving mode may preferably be confirmed by the driver prior to the change.

Furthermore, the recommendation of the driving mode may be selected based on stored data of the actual driving mode in correlation with the traveling position (e.g., traveling road) of the vehicle. In this manner, the driving support system of the present invention can readily determine the recommendation of the driving mode by predictably defining the driver's preference based on the stored driving modes in correlation with the traveling position. That is, the recommendation of the driving mode may suitably reflect the driver's preference.

Such changes and modifications are to be understood as being within the scope of the present invention as defined by the appended claims.

What is claimed is:

1. A driving support system for a vehicle being adaptable to a manual driving mode, a partially-automated driving mode and a fully-automated driving mode, the driving support system comprising:

a detection means for detecting a surrounding condition of the vehicle and a traveling condition of the vehicle; and an information provision means for providing driving support information for the driver of the vehicle based on the surrounding condition of the vehicle and the traveling condition of the vehicle detected by the detection means and when the surrounding condition of the vehicle and the traveling condition of the vehicle meet a criterion for information provision, wherein the information provision means provides the driving support information from a lower risk level to a higher risk level to the driver when the vehicle is in the manual driving mode, and provides the driving support information at the higher risk level without the driving support information at the lower risk level to the driver when the vehicle is in the fully-automated driving mode.

2. The driving support system according to claim 1, wherein the information provision means uses different predetermined criteria for information provision in a partially-automated driving mode and in a fully-automated driving mode when the vehicle is adaptable to both of the partially-automated driving mode and the fully-automated driving mode.

3. The driving support system according to claim 1, wherein the information provision means categorizes the vehicle into a plurality of risk levels by using the predetermined criterion for information provision based on the surrounding condition of the vehicle and the traveling condition of the vehicle detected by the detection means, and the information provision means defines different predetermined criterion for information provision in the manual driving mode and in the automated driving mode by assigning different risk levels thereto respectively.

4. The driving support system according to claim 3, wherein, when the vehicle is in the partially-automated driving mode, the information provision means provides the driving support information of all risk levels ranging from a lowest risk level that is lower than the lower risk level to a highest risk level.

5. The driving support system according to claim 3, wherein the information provision means provides the driving support information in the fully-automated driving mode only when the vehicle condition is determined to be in at least a certain risk level or a higher risk level based on the surrounding condition of the vehicle and the traveling condition of the vehicle detected by the detection means.

6. The driving support system according to claim 3, wherein at least two of three driving modes including the manual driving mode, the partially-automated driving mode and the fully-automated driving mode have respectively different predetermined criteria for information provision for categorizing the vehicle condition into the plurality of the risk levels.

7. The driving support system according to claim 3, wherein the information provision means changes the predetermined criterion for information provision in at least one of three driving modes including the manual driving mode, the partially-automated driving mode and the fully-automated driving mode based on at least one of vehicle speed and road condition where the vehicle is traveling.

8. The driving support system according to claim 1 further comprising:
a determination means for determining a recommended mode of driving based on an environment of the vehicle, wherein the information provision means provides discrepancy information regarding a discrepancy between a current type of driving mode and the recommended type of driving mode when the current type of driving mode is different from the recommended type of driving mode.

9. The driving support system according to claim 8, wherein the determination means includes a current position detection unit for detecting a current position of the vehicle, and
the determination means determines the recommended type of driving mode based on the current position of the vehicle as the environment of the vehicle.

10. The driving support system according to claim 8, wherein the determination means includes a storage unit for storing the current type of driving mode in correlation with the environment of the vehicle, and
the determination means determines the recommended type of driving mode according to preference of the driver based on the type of driving mode stored in the storage unit.

11. The driving support system according to claim 8 further comprising:
a driving condition alteration means for altering the type of driving mode of the vehicle based on the recommended type of driving mode determined by the determination means.

12. The driving support system according to claim 1 further comprising:
a criteria setting means for setting the predetermined criterion for information provision.

13. A driving support system for a vehicle being adaptable to a manual driving mode, a partially-automated driving mode and a fully-automated driving mode, the driving support system comprising:
a current position detection means for detecting a current position of the vehicle;
a driving condition alteration means for altering a type of driving of the vehicle according to the current position of the vehicle;
a detection means for detecting a surrounding condition of the vehicle and a traveling condition of the vehicle; and
an information provision means for providing driving support information for the driver of the vehicle based on the surrounding condition of the vehicle and the traveling condition of the vehicle detected by the detection means and when the surrounding condition of the vehicle and the traveling condition of the vehicle meet a criterion for information provision, wherein
the information provision means provides the driving support information from a lower risk level to a higher risk level to the driver when the vehicle is in the manual driving mode, and provides the driving support information at the higher risk level without the driving support information in the lower risk level to the driver when the vehicle is in the fully-automated driving mode.

14. The driving support system according to claim 13, wherein the information provision means compares a preferred vehicle device setting in the type of driving altered by the driving condition alteration means and a current vehicle device setting, and
the information provision means provides discrepancy information when the preferred vehicle device setting and the current vehicle device setting are different.

15. The driving support system of claim 1, wherein the driving support information is provided for the driver visually from a display unit or vocally from a speaker.

16. The driving support system of claim 13, wherein the driving support information is provided for the driver visually from a display unit or vocally from a speaker.

17. The driving support system of claim 1, wherein the criterion for information provision employs respectively different thresholds for categorizing risk levels in the manual driving mode, the partially-automated driving mode and the fully-automated driving mode.

18. The driving support system of claim 13, wherein the criterion for information provision employs respectively different thresholds for categorizing risk levels in the manual driving mode, the partially-automated driving mode and the fully-automated driving mode.

19. The driving support system of claim 1, wherein the information provision means switches the criterion for information provision depending on a driving mode of the vehicle.

20. The driving support system of claim 13, wherein the information provision means switches the criterion for information provision depending on a driving mode of the vehicle.

* * * * *